United States Patent Office 3,706,800
Patented Dec. 19, 1972

---

3,706,800
PROCESS FOR THE PREPARATION OF AMINIMIDES
James A. Hartlage, Burnsville, and William J. McKillip, Minneapolis, Minn., assignors to Ashland Oil, Inc., Houston, Tex.
No Drawing. Continuation-in-part of abandoned application Ser. No. 514,705, Dec. 17, 1965. This application Feb. 26, 1970, Ser. No. 14,668
Int. Cl. C07c *103/30*
U.S. Cl. 260—561 H       12 Claims

---

ABSTRACT OF THE DISCLOSURE

This invention relates to a process for the preparation of trialkylammonium acrylimines, trivially designated aminimides. More specifically, the present invention relates to a one-step process for preparing an aminimide from a carboxylic acid ester.

---

This application is a continuation-in-part of Ser. No. 514,705, filed Dec. 17, 1965, now abandoned.

Particularly representative of the aminimide compounds that can be prepared in accordance with the novel process of the present invention are those having the general formula:

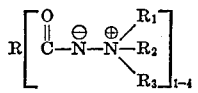

wherein R represents the residue of the mono- or polycarboxylate from whence the indicated aminimide is derived, $R_1$ to $R_3$ are alkyl, aryl hydrocarbon radicals, and radicals in which $R_1$ and $R_2$, when taken together with the nitrogen to which they are attached, form a heterocyclic ring selected from the group consisting of pyrrolidine, pyrrole, pyrroline and piperidine. The term "aryl" as employed herein is meant to define an aromatic radical in which the unsatisfied valence is a carbon atom of the aromatic nucleus.

Still another important class of polyaminimides which can be prepared in accordance with this invention are those derived from a linear addition polymer obtained by the homo- or copolymerization of a vinyl ester such as the acrylates, methacrylates, vinyl adipates, etc. Similarly, polyaminimides can be prepared by the process of this invention from like addition polymers having a plurality of pendant ester groups such as obtained by copolymerizing a vinyl monomer with a diester of an α,β-ethylenically unsaturated dicarboxylic acid, as, for example, diethyl maleate, dimethyl fumarate, dimethyl itaconate, etc.

In accordance with this invention, aminimides are prepared by reacting a hydrazinium salt and an ester of a carboxylic acid in the presence of a strong base. The underlying reaction of this novel process can be illustrated by the following schematic showing the conversion of a carboxylate grouping to the corresponding aminimide grouping:

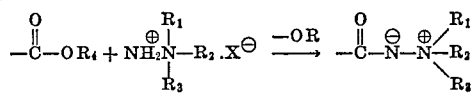

In the above schematic, $R_1$–$R_3$ are as above indicated, whereas X representas a radical capable of forming the anion portion of the hydrazinium salt and $R_4$ represents an alkyl radical of 1-20 carbon atoms.

The hydrazinium salt employed in the formation of the aminimide in the manner illustrated can be obtained by the reaction of tertiary amine and a halo-amine having the general formula:

$$NH_2X$$

wherein X is a halogen, e.g., bromine, chlorine or fluorine. Preferably X is chlorine, and the chloramine is readily obtained by the reaction of ammonia and chlorine. This reaction can be carried out at temperatures of from 20° to 100° C. and at pressures of from 0 to 100 p.s.i. Preferably, the reaction is conducted in the vapor phase using an excess of ammonia.

The tertiary amines that can be reacted with a haloamine to produce applicable hydrazinium salts are the amines having the formula:

wherein $R_1$, $R_2$ and $R_3$ have the above-indicated meaning but more preferably are alkyl groups having from 1 to 10 carbon atoms. The reaction of tertiary amine and haloamine is usually conducted by bubbling the halo-amine in gaseous form through the tertiary amine, which is usually in liquid form at room temperature and atmospheric pressure.

Applicable hydrazinium salts can also be obtained by the reaction of an unsymmetrical hydrazine of the formula

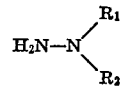

where $R_1$ and $R_2$ have the above indicated meaning, with a quaternizing agent. Suitable quaternizing agents are those having the formula $R_3X$ wherein $R_3$ has the above indicated meaning and X is chlorine, bromine, iodine or a radical capable of forming the anion of the resultant quaternary salt such as methyl sulfonate, ethyl sulfonate, toluene sulfonate, xylene sulfonate, benzene sulfonate and the like. As indicated above, $R_3$ is preferably an alkyl group containing 1 to 10 carbon atoms, especially the lower alkyl groups such as methyl, ethyl, propyl or butyl.

The reaction of the unsymmetrical hydrazine with the quaternizing agent can be conducted in the absence of a solvent if a homogeneous liquid mixture of reagents can be formed or in the presence of inert solvent which is generally a non-polar solvent such as carbon disulfide or benzene. The reaction temperature can vary from room temperature to elevated temperatures which do not cause decomposition of the reagents or products. Generally the reaction is carried out at room temperature.

As indicated above, the hydrazinium salt is reacted with the ester in the presence of a strong base. Preferably, the aminimide forming reaction is carried out in a solvent medium. The reaction mixture is then evaporated and the aminimide can be extracted with a suitable solvent or with the reaction solvent which does not cause appreciable solution of the by-product of the cation of the base with the anion of the quaternary salt. Various other methods can be employed to purify the resulting aminimide, such as extraction followed by crystallization or precipitation, evaporation, and chromatographic separation.

Since the reaction of the ester with the hydrazinium salt is a nucleophilic displacement type reaction, it is preferable, as indicated, to carry out the reaction in a mutual solvent. Examples of applicable solvents include the lower alkanols, dimethyl sulfoxide, acetonitrile, dioxane, tetrahydrofuran, glymes (dimethyl ethers of ethylene glycol) and the like. The preferred solvents are the lower alkanols such as methanol, ethanol, isopropanol and tertiary butanol.

The aminimide forming reaction temperature is generally maintained in a range between 0° and 80° C., preferably between about 60° and 80° C. The reaction is preferably conducted at ambient pressures although superatmospheric pressures are applicable. An excess of ester may be employed in order to insure reaction of all of the hydrazinium salt. In view, however, of the nearly quantitative yields which can be obtained in the practice of the invention, it is preferable to use nearly equivalent amounts of ester and the hydrazinium salt.

Bases which can be used in the processes of this invention incude any of the strong inorganic and organometallic bases. Representative of the strong inorganic bases are the alkali metal hydroxides; especially sodium and potassium hydroxide. Representative of the organicmetallic bases are the lower alkoxides of an alkali metal and the lower alkyl alkali metals such as butyl lithium, propyl sodium, butyl potassium and the like. Particularly preferred bases are the lower alkoxides of the alkali metals. Examples of such preferred bases are sodium or potassium methoxide, ethoxide, propoxide and butoxide. The base is ordinarily added to the reaction mixture in an amount of about that equivalent to hydrazinium salt present in the reaction mixture.

Besides the polymers containing a plurality of pendant ester groups, the esters of essentially all carboxylic acids can be employed to form the aminimide derivatives thereof in accordance with this invention. As previously mentioned, the ester grouping can be an alkyl group containing from 1–20 carbon atoms but preferably containing a lower alkyl group such as methyl, ethyl, propyl, butyl, pentyl and hexyl. An enumeration of carboxylic acids, the esters of which can be used in accordance with this invention, is as follows:

(a) saturated normal aliphatic monocarboxylic acids, such as acetic, propionic, butyric, valeric, caproic, enanthylic, caprylic, pelargonic, capric, hendecanoic, lauric, tridecanoic, myristic, pentadecanoic, palmitic, margaric, stearic, nonadecanoic, arachidic, heneicosanoic, behenic, tricosanic, tetracosanic, pentacosanic, cerotic, heptacosanoic, octacosanoic, nonacosanoic, triacontanoic, melissic, lacceric, and the like, including mixtures thereof;

(b) unsaturated aliphatic monocarboxylic acids, such as acrylic, methacrylic, crotonic, 3-butenoic, angelic, senecioic, 2-nonenoic, hydrosorbic, sorbic, 4-tetradecenoic, oleic, linolenic, linoleic, propiolic, tetrolic, 3-butynoic, 2,8-decadiene-4,6-diynoic, and the like, including mixtures thereof;

(c) carboxylic acids of carbocyclic and heterocyclic compounds, such as cyclobutanecarboxylic, 2-norcamphanecarboxylic, 5 - acenaphthenecarboxylic, 3 - phenanthrenecarboxylic, 2-pyrrolecarboxylic, 9-acridaucarboxylic, benzoic, 2-naphthoic, 1-anthroic, nicotinic, quinaldic, cinchoninic, pyrazinoic, antipyric, cyclohexaneacetic, cyclopentane tridecanoic, cyclohexaneacetic, phenanthrenebutyric, 2-cyclopentene - 1 - malonic, 2-cyclopentane-1-malonic, fluorenesuccinic, naphthaleneacrylic, phenanthrenecrotonic, thiophenedicarboxylic and the like, including mixtures thereof;

(d) aliphatic dicarboxylic acids, such as oxalic, malonic, succinic glutaric, adipic, vinyl adipic, pimelic, suberic, azelaic, sebacic, brassylic, thapsic, maleic, fumaric, glutaconic, hydromuconic, dodecanedioic, hendecanedioic, octenedioic heptadienedioic, hexynedioic, decadiynedioic, acetylenedicarboxylic, dimers and trimers of oleic, linoleic and linolenic and the like, including mixtures thereof;

(e) carbocyclic and heterocyclic polycarboxylic acids, such as phthalic, isophthalic, terephthalic, cyclohexanedicarboxylic, naphthalic, dinicotinic, acridinic, quinolinedicarboxylic, cyclohexaneacetic, trimellitic, trimesic and the like, including mixtures thereof;

(f) aldehydic and keto acids, such as malonaldehydic, phthalaldehyde, formyl-propionic, formyl-caproic, glyoxylic, oxocyclohexanepropionic, acetoacetic, pyruvic, levulinic, oxocapric, the inner ester butyrolactone and the like, including mixtures thereof;

(g) hydroxy acids, such as glycolic, lactic, salicylic, cresotic, mandelic, and the like, including mixtures thereof; and (h) protected amino acids, such as carbobenzoxyglycine, carbobenzoxy-glutamic acid, N-cyclohexyl-β-alanine, β-allylaminopropionic, β-anilinopropionic and t-butoxy-carbonyl proline.

The principal utility of the aminimides prepared in accordance with this invention resides in their abilty to be rearranged to the correspondng isocyanates. The resultant polyisocyanates are, of course, well known cross-linking agents useful in the formation of polyurethanes. The rearrangement of an aminimide group is accomplished preferably by pyrolysis and can be illustrated as follows:

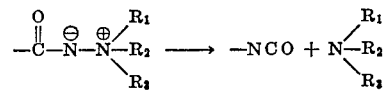

wherein $R_1$ and $R_3$ have the above-indicated meanings. Pyrolysis of the aminimide(s) groups can be conducted by heating the aminimide to temperatures above about 150° C., and results in the formation of the isocyanate and a tertiary amine as shown in the above equation.

Since the aminimides are stable towards the polyhydroxy compounds employed in the formation of polyurethanes, they can be combined with such polyhydroxy compounds to give rise to one-package polyurethane systems which can even include the polymerization catalyst. These systems are stable until the mixture is decomposed by heating to elevated temperatures upon which polyurethane formation takes place. Although the foregoing utility is particularly valuable, it is to be understood that the isocyanates derived from the aminimides can also be employed in all other applications heretofore developed for isocyanates.

The formation of the aminimides and the resulting isocyanates is further illustrated by the following examples in which all units of quantity are by weight unless otherwise stated.

EXAMPLE I

This example illustrates the formation of an aminimide by reacting an alkyl ester of a monocarboxylic acid having eight carbon atoms with trimethylhydrazinium iodide.

Into a reactor equipped with a mechanical stirrer and addition funnel are dissolved 6 parts by weight methyl caprylate, 8.04 parts by weight trimethylhydrazinium iodide, 2.36 parts by weight sodium methoxide in 0.87 part by weight acetonitrile. The reaction mixture was refluxed for four hours. After this time, 2.4 parts by weight chloroform were added to the reaction mixture. The mixture was then filtered to remove the insoluble salts. The resulting filtered solution was washed once with water and dried over magnesium sulfate. The dried solution was then stripped of volatiles at 60° C. and at 10 to 20 mm. Hg pressure. Five parts of a light yellow liquid was obtained, representing a yield of 66% of trimethylamine caprylimide. The product was identified by infrared analysis.

The aminimide was then distilled at 80° to 85° F. and at 10 to 20 mm. Hg pressure to yield 3.4 parts of a colorless liquid, representing a yield of 63% of isocyanate. The product was identified by boiling point and infrared analysis.

EXAMPLE II

This example illustrates the formation of an aminimide by reacting an ester of a monocarboxylic acid, having 14 carbon atoms, with trimethylhydrazinium iodide.

Into a reactor were placed 48.4 parts methyl myristate, 13.5 parts sodium methoxide, 44.2 parts trimethylhydrazinium iodide and 4.35 parts acetonitrile. The reaction was refluxed for 3½ hours, after which time the mixture was filtered to remove the solids and dried. Twenty-nine parts sodium iodide were recovered in the filtration, representing a 96.6% completion of the desired reaction. The filtrate was evaporated on a rotary evaporator; and 56 parts of the product were obtained as a white solid. This represented a 98% yield of trimethylamine methyl myristimide. The product was identified by melting point and infrared analysis. The latter test showed that only a trace of ester carbonyl groups remained.

A portion of the aminimide was subjected to distillation. Trimethylamine was liberated on heating, and 20.4 parts of distillate were collected. Infrared investigation indicated that isocyanate was formed.

EXAMPLE III

This example illustrates the formation of a diaminimide by reacting an alkyl ester of a dicarboxylic acid with trimethylhydrazinium iodide.

Into a reactor were placed 10 parts of dimethyl sebacate, 24.1 parts of trimethylhydrazinium iodide, 13.5 parts of sodium methoxide and 1.5 parts acetonitrile. The reaction was refluxed for 3 hours, after which time the reaction mixture was filtered to remove undesirable solids. The resulting solution was stripped, and the solid was identified by infrared analysis and found to be bis-trimethylamine sebacimide. The amount of sodium iodide which was removed by filtration, i.e., 13.2 parts, indicated that the reaction had reached 79% completion.

EXAMPLE IV

This example illustrates the formation of an aminimide by reacting an alkyl ester with trimethylhydrazinium iodide in the presence of dimethyl sulfoxide and sodium methoxide.

Into a reactor equipped with a stirrer, were placed 16.1 parts trimethylhydrazinium iodide, 15.8 parts methyl octonate and 4.86 parts sodium methoxide. Also, 3.12 parts dimethyl sulfoxide were added as a solvent. The reaction was stripped for one hour. The finely-divided precipitate, which remained after stripping, was filtered off and placed into water. To the water dispersion was added sufficient hydrochloric acid (.5 N) to give a pH of 7. The solid material dissolved.

The resulting solution was stripped to dryness, leaving a mushy white solid, which then was extracted with chloroform twice.

The chloroform solution, when cooled, yielded a small amount of white crystals. These crystals and the liquid were identified by infrared. The liquid was shown to be hexanoic aminimide when compared to a known sample of hexanoic aminimide.

EXAMPLE V

This example illustrates the formation of aminimide by first forming hydrazinium chloride by reacting ammonia and chlorine and reacting the chloramine so formed with trimethylamine. The hydrazinium chloride is then reacted with a fatty ester to produce the aminimide.

To a reactor at room temperature are pumped 10 parts by weight ammonia and 10 parts chlorine. Chloramine is produced by the reaction in an amount equivalent to the amount of chlorine added, i.e., 7.2 parts.

The chloramine so produced is bubbled through trimethyl amine in another reactor.

Trimethylhydrazinium chloride is produced in quantitative yields. The trimethylhydrazinium chloride is then added to a reactor containing an equimolar amount of methyl stearate, a small amount of sodium hydroxide and an amount of tetrahydrofuran sufficient to disperse the mixture. The reaction is refluxed for about four hours, after which time the mixture is filtered to remove solids and dried. The filtrate is evaporated and analyzed. Analysis indicates the presence of trimethylamine stearimide.

EXAMPLE VI

This example illustrates the preparation of trimethylamine carbobenzoxyglycidimide.

Into a suitable reaction vessel equipped with a stirrer, thermometer, reflux condenser and drying tube were charged 160 parts of t-butanol, 5.53 parts of trimethylhydrazinium chloride and 11.1 parts of methyl carbobenzoxyglycinate. After stirring for 10 minutes, 2.7 parts of sodium methoxide were added. With stirring, the reaction mixture was heated to 45°–55° C. and held for five hours. The pH of the reaction mixture after the indicated reaction time was 7–7.3. The crude reaction product upon cooling to room temperature was filtered and the resultant filtrate placed in a flash evaporator and stripped. The residue was taken up in ethanol, filtered and again stripped. Chromatographic analysis of the purified product showed it to be 1,1,1-trimethylamine carbobenzoxyglycidimide.

EXAMPLE VII

Into a suitable reaction vessel equipped as in the previous example were charged 55.2 parts of trimethylhydrazinium chloride, 92.5 parts of the methyl ester N-cyclohexyl-$\beta$-alanine and 11.5 parts of sodium dissolved in 400 parts isopropanol. The reaction mixture was heated to 55° C. with agitation and held thereat for six hours. The reaction mixture was then filtered and the filtrate evaporated, yielding 109 parts of golden yellow liquid which solidified to a white solid. The resultant product was identified as trimethylamine-$\beta$-cyclohexylaminopropionylimide by n.m.r. (nuclear magnetic resonance) analysis.

EXAMPLE VIII

Into a suitable reaction vessel equipped as in the previous example were charged 55.7 parts trimethylhydrazinium chloride, 75.1 parts ethyl N-allyl-$\beta$-aminopropionate and 11.6 parts sodium dissolved in 400 parts of isopropanol. With stirring, the reaction mixture was heated at 55° C. for five hours and then allowed to stand overnight.

The reaction product was filtered and evaporated. 86.4 parts of residue in the form of a golden yellow liquid was obtained. By n.m.r., the product was identified as trimethylamine-$\beta$-allylaminopropionylimide.

EXAMPLE IX

Into a suitable reaction vessel equipped as in the previous example were charged 42 parts triethylhydrazinium chloride, 68 parts of ethyl-$\beta$-anilino propionate and 8.5 parts of sodium dissolved in 400 parts isopropanol. The reaction mixture was heated to 58° C. and held thereat for about 20 hours. The reaction mixture was cooled to room temperature, filtered and then evaporated in vacuo. The product in the amount of 77 parts or 96% yield by n.m.r. was identified as triethylamine-$\beta$-anilino propionylimide.

EXAMPLE X

Into a suitable reaction vessel equipped as in the previous example were charged 10.4 parts of $\alpha$-methoxy methyl acetate, 11 parts of trimethylhydrazinium chloride, 5.4 parts of sodium methoxide and 120 parts of isopropanol. The reaction mixture was heated with stirring to 65°–70° C. and held for six hours. After completion of the reaction, the precipitated sodium chloride was removed by filtration and the filtrate reduced under vacuum. The residue was recrystallized from ethyl acetate twice, yielding 10 parts of product having a melting point of 75°–76° C. By n.m.r. the product was identified as trimethylamine $\alpha$-methoxy acetimide. Analysis (CHN) calculated for product (percent): C, 49.31; H, 9.58; N, 19.18. Found (percent): C, 50.01; H, 9.60; N, 19.16.

EXAMPLE XI

Into a suitable reaction vessel equipped with a stirrer, thermometer and condenser were charged 250 parts of isopropanol and 4.6 parts sodium. After effecting solution of the sodium 49.2 parts of trimethylhydrazinium tosylate were charged to the reaction vessel. With stirring, the reaction mixture was heated to 40°–45° C., where-upon 17.2 parts of butyrolactone were added over a 75 minute period. The reaction mixture was held at the indicated temperature with stirring for 12 hours and the filtrate stripped. Three recrystallizations from chloroform provided a yield of product in the amount of 24.2 parts representing 75% of theory. By n.m.r., the product was identified as trimethylamine-γ-hydroxy propionimide.

EXAMPLE XII

This example illustrates the preparation of trimethylamine carboximidyl-2-carbethoxycyclohex-4-ene.

Into a suitable reaction vessel equipped as in the previous example were charged 22.6 parts of diethyltetrahydro-$\Delta^4$-phthalate, 22.1 parts of trimethylhydrazinium chloride, 120 parts of t-butanol and 10.8 parts of sodium methoxide. The reaction mixture was heated at 48° C. with stirring for 48 hours and then filtered. The residue obtained upon evaporating the filtrate in vacuo was extracted with benzene. Evaporation of the benzene layer gave 16 parts of a viscous, pale-yellow oil. A thin-layer chromatography showed the product to be one component whose infrared spectrum (smear) showed peaks at 3025, 1730, 1655 and 1580 cm.$^{-1}$, characteristic of the expected aminimide.

Four parts of the aminimide product was pyrolyzed under vacuum. Decomposition took place at about 165° C. and yielded 2.2 parts of isocyanate which distilled as a colorless oil. The infrared spectrum identified the pyrolyzed product as the corresponding isocyanate which had the following elemental analysis: C, 61.20; H, 6.80. Calculated for $C_{10}H_{13}NO_3$: C, 61.52; H, 6.71.

A few drops of the isocyanate were then mixed with a large excess of anhydrous methanol and a drop of triethylamine and allowed to stand for 15 hours at room temperature. Evaporation of the solvent gave a colorless oil whose infrared spectrum confirmed the urethane structure.

EXAMPLE XIII

Into a suitable reaction vessel equipped as in the previous example were charged 11.0 parts of trimethylhydrazinium chloride, 10.0 parts of methyl methacrylate, 5.4 parts of sodium methoxide and 60 parts of t-butanol. The reaction mixture was heated at 48° C. for 6 hours and then filtered under pressure. Evaporation of the filtrate gave 12.9 parts of a white solid. Recrystallization from benzene yielded a product exhibiting a melting point of 149–150° C. The mixture melting point with authentic trimethylamine methacrylimide was not depressed.

Two parts of the amine methacrylimide of this example were pyrolyzed at 50 mm. pressure by gradually increasing the pot temperature from 135–160° C. A water-white liquid was obtained whose infrared spectrum (neat) showed the expected absorption at 2270 and 1655 cm.$^{-1}$. The isopropenyl isocyanate was further identified by its adduct with α-naphthylamine, M.P. 226–229° C. (lit. rep. M.P. 228° C.)

EXAMPLE XIV

Into a suitable reaction vessel equipped as in the previous example were charged 8.6 parts of methyl acrylate, 11.0 parts of trimethylhydrazinium chloride, 5.4 parts of sodium methoxide and 60 parts of t-butanol. The reaction mixture was heated at 45° C. for 7 hours and then filtered under pressure. Evaporation of the filtrate gave 11.4 parts of a viscous, yellow liquid which crystallized upon standing. Vacuum sublimation gave 4.5 parts of a white solid which, on resublimation showed no depression in the mixture melting point with authentic trimethylamine acrylimide.

EXAMPLE XV

Into a suitable reaction vessel equipped as in the previous example were charged 25.2 parts of the methyl ester of trimesic acid, 120 parts of isopropanol, 11 parts of trimethylhydrazinium chloride and 5.5 parts of sodium methoxide. With agitation, the reaction mixture was held at 60° C. for six hours. After the indicated reaction time, a neutral pH was observed and infrared analysis indicated an absence of ester carbonyl and the expected aminimide band at 1585 cm.$^{-1}$.

Sodium chloride was removed by filtration and the filtrate evaporated on a rotary evaporator. The residue was then recrystallized from ethanol-ethyl acetate yielding 35 parts of product having a melting point of 185–187° C. Analysis by n.m.r. confirmed the assigned structure of trimethylamine 1,3,5-benzene tricarboximide. Analysis (CHN) calculated for product (percent): C, 57.14; H, 7.94; N, 22.22. Found (percent): C, 57.18; H, 7.87; N, 22.31.

EXAMPLE XVI

This example illustrates the preparation of the corresponding polyaminimide derivative of a polyester addition product.

Into a suitable reaction vessel equipped with a stirrer, condenser and thermometer were charged 50 parts of a poly-methyl acrylate having an acid value of 38.2, 15 parts of trimethylhydrazinium chloride and 80 parts of tertiary butanol. A solution of 10.4 parts of potassium butoxide dissolved in 80 parts of tertiary butanol was added to the reaction mixture over a one hour period while maintaining the reaction temperature at 80° C. Following the addition of the base, the reaction mixture was held at 83° C. for 22 hours. The reaction mixture was then filtered twice and the non-volatile content adjusted to 70%. Infrared analysis indicated that substantialy all of the ester groups had been converted to the aminimide structure.

EXAMPLE XVII

This example illustrates the conversion of the pendant ester groups of a vinyl addition copolymer to aminimide groups.

Into a suitable reaction vessel equipped as in the previous example were charged 300 parts of methyl acrylate, 720 parts of butyl acrylate, 180 parts of styrene, 800 parts of xylene and 18 parts of VAZO catalyst. With agitation, the polymerization mixture was held at 120°–130° C. for six hours and thereupon 0.6 part of ditertiary butyl peroxide was added. Polymerization was continued for another five hours resulting in a polymer solution containing 60% non-volatile content and a Gardner-Holdt viscosity of F.

Into a suitable reaction vessel equipped in a similar manner were charged 42 parts of the above copolymer, 7 parts of trimethylhydrazinium chloride, 1.46 parts of sodium dissolved in methanol, 80 parts of xylene and 120 parts of isopropanol. With stirring, the reaction mixture was heated to 80°–85° C. and held for 24 hours. The reaction mixture was then filtered twice to yield a faintly cloudy solution having non-volatile content of 60%. Infrared analysis showed that the pendant ester groups of the copolymer had been converted to aminimide groups.

EXAMPLE XVIII

This example illustrates the preparation of four different monoaminimides in accordance with this invention employing the methyl ester of the respective starting monocarboxylic acids. The procedure observed in each instance was essentially the same in that equimolar amounts of the ester, trimethylhydrazinium chloride and sodium methoxide were reacted in t-butanol as a solvent at a temperature within the range of 45°–60° C. The length of the reaction in each case was such so as to provide a neutral pH. Following completion of the reaction, the reaction mixture was filtered and the filtrate evaporated in vacuo to give the crude aminimide. The aminimides prepared in the foregoing manner were:

Trimethylamine laurimide

The crude reaction product was isolated as described above. Recrystallization from hexane gave white needles M.P. 53–54° C. The infrared spectrum (halocarbon mull) showed the expected absorption at 1575 cm.$^{-1}$. The N.M.R. spectrum exhibited a singlet at 6.59 p.p.m. and multiplets from 7.7 to 9.0 p.p.m. and at 912 p.p.m. in the expected ratio of 9:20:3, respectively.

*Analysis.*—Calcd. for $C_{15}H_{32}N_2O$ (percent): C, 70.25; H, 12.58; N, 10.92. Found (percent): C, 70.32; H, 12.46; N, 11.02.

Trimethylamine adamantane-1-carboximide

The crude product was isolated as generally described above. Sublimation at 110° C. and 0.2 mm. gave a white crystalline compound, M.P. 174–175°. The infrared spectrum showed the aminimide absorption at 1750 cm.$^{-1}$ and no ester carbonyl band. The N.M.R. spectrum exhibited absorption at 8.29, 8.12, and 6.67 p.p.m. in a ratio (the two former to the last) of 15:9, as expected.

*Analysis.*—Calcd. for $C_{14}H_{24}N_2O$ (percent): C, 71.14; H, 10.23; N, 11.86. Found (percent): C, 71.28; H, 10.23; N, 11.86.

Trimethylamine benzimide

The crude product was isolated as described generally above. Recrystallization from chloroform-hexane gave a white crystalline product whose mixture melting point with authentic trimethylamine benzimide was not depressed. The infrared spectra were identical.

Trimethylamine nicotinimide

The crude product was isolated by the procedure generally described above. Several recrystallizations from benzene gave a white crystalline M.P. 110°–112° C. The infrared spectrum showed the expected band at 1560 cm.$^{-1}$ and no ester carbonyl band. The N.M.R. spectrum showed absorption at 6.54 (singlet); 2.81 (two doublets); 1.83 (two triplets); 1.49 (two doublets) and 0.92 (multiplet) p.p.m. in the expected area ratio of 9:1:1:1:1.

*Analysis.*—Calcd. for $C_9H_{13}N_3O$ (percent): C, 60.31; H, 7.31; N, 23.45. Found (percent): C. 60.60; H, 7.23; N, 23.51.

Trimethylamine perfluoropropionimide

A quantitative yield of the crude product was obtained by the general procedure described above. Chromatographic on silica gel with chloroform as the eluent gave a white crystalline compound, M.P. 104°–107° C. The infrared spectrum showed the expected absorption at 1659 cm.$^{-1}$.

*Analysis.*—Calcd. for $C_6H_9R_5N_2O$ (percent): C, 32.73; H, 4.12; N, 12.73. Found (percent): C, 32.96; H, 4.27; N, 12.70.

What is claimed is:

1. A process for preparing an aminimide which comprises reacting in a mutual solvent a $C_1$–$C_{20}$ alkyl ester of a carboxylic acid and a hydrazinium salt corresponding to the formula:

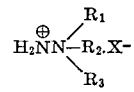

wherein $R_1$, $R_2$ and $R_3$, when taken singly, represent an alkyl or an aryl hydrocarbon radical; $R_2$ and $R_3$, when taken together with the nitrogen atom to which they are attached form a heterocyclic ring selected from the group consisting of pyrrolidine, pyrrole, pyrroline and piperidine; and where X represents a halide or an aryl sulfonate radical; said reaction being carried out in the presence of about an equivalent amount based on said hydrazinium salt of a base selected from the group consisting of an alkali metal hydroxide, a lower alkoxide of an alkali metal and a lower alkali metal alkyl.

2. A process in accordance with claim 1 wherein the $R_1$, $R_2$ and $R_3$ substituents of said hydrazinium salt represent an alkyl radical having from 1–10 carbon atoms, and X represents a halide radical.

3. A process in accordance with claim 2 wherein said mutual solvent is a lower alkanol.

4. A process in accordance with claim 3 wherein said lower alkanol is isopropanol or tertiary butanol.

5. A process in accordance with claim 4 wherein said lower alkanol is isopropanol.

6. A process in accordance with claim 5 wherein said alkyl ester of a carboxylic acid is a lower alkyl ester thereof.

7. A process in accordance with claim 6 wherein the $R_1$, $R_2$ and $R_3$ substituents of said hydrazinium salt represent a lower alkyl radical and X represents a chloride radical.

8. A process in accordance with claim 7 wherein said hydrazinium salt is trimethyl hydrazinium chloride.

9. A process in accordance with claim 8 wherein said base is a lower alkoxide of an alkali metal.

10. A process in accordance with claim 9 wherein said alkali metal is sodium.

11. A process in accordance with claim 10 wherein the carboxylic acid ester is methyl acrylate.

12. A process in accordance with claim 10 wherein the carboxylic acid ester is methyl methacrylate.

References Cited

UNITED STATES PATENTS 3,062,881  11/1962  Gutmann _____ 260—557
3,488,389  1/1970   McKillip _____ 260—561 H LEWIS GOTTS, Primary Examiner E. G. LOVE, Assistant Examiner U.S. Cl. X.R.

260—293.76, 295.5 H, 326.85, 332.2, 404.5, 534 C, 534 E, 534 G, 534 M, 557 H, 558 H